United States Patent [19]

Yonekubo

[11] Patent Number: 4,933,924
[45] Date of Patent: Jun. 12, 1990

[54] OPTICAL HEAD AND MAGNETO-OPTICAL READ/WRITE DEVICE

[75] Inventor: Masatoshi Yonekubo, Suwa, Japan

[73] Assignee: Seiko Epson Corporation, Tokyo, Japan

[21] Appl. No.: 213,813

[22] Filed: Jun. 30, 1988

[30] Foreign Application Priority Data

Jul. 3, 1987 [JP] Japan .............................. 62-166412
Jul. 6, 1987 [JP] Japan .............................. 62-168162
Jul. 7, 1987 [JP] Japan .............................. 62-169461

[51] Int. Cl.$^5$ .............................................. G11B 11/14
[52] U.S. Cl. ................................. 369/44.11; 369/13; 360/114
[58] Field of Search ................... 369/32, 43–47, 369/112, 13; 250/201; 360/114; 365/122

[56] References Cited

U.S. PATENT DOCUMENTS 4,609,813  9/1986  Cohen ............................ 369/45 X
4,783,589  11/1988  Ando ............................ 369/45 X Primary Examiner—Robert L. Richardson
Attorney, Agent, or Firm—Blum Kaplan

[57] ABSTRACT

An optical head for use in optical read/write system for reading or writing data from or to a magneto optical recording medium includes an objective lens. A light beam divider divides light reflected from the optical recording medium which passes through the objective lens into divided beams oriented in at least two directions. A cross-sectional form changer changes the cross-section of the divided beams as a function of the focus deviation of the objective lens. At least one analyzer is disposed in each of the divided light beam paths. Photoelectric transducers are disposed in each of the divided light beam paths so that the analyzer is disposed between each transducer and the light beam divider to provide signals in response thereto. A circuit receives the signals of the transducers and in response thereto focuses the objective lens.

51 Claims, 8 Drawing Sheets

FIG. 13
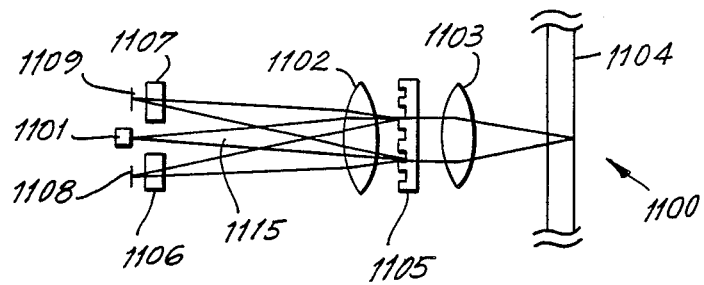
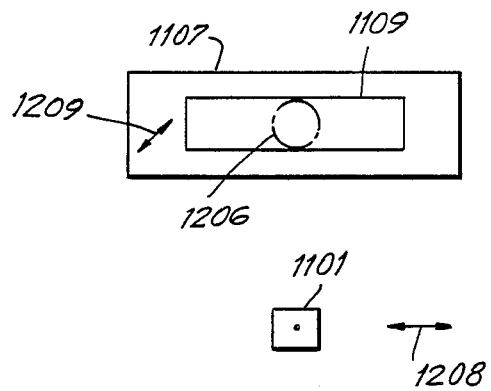
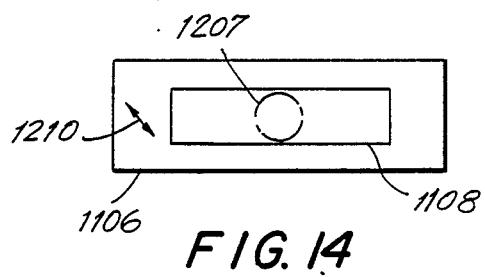
FIG. 14

OPTICAL HEAD AND MAGNETO-OPTICAL READ/WRITE DEVICE

BACKGROUND OF THE INVENTION

The present invention relates generally to an optical read/write device for writing and reading data to and from an optical recording medium, and to an optical head incorporated in such device, and, in particular, to a device for use in writing and reading data by means of a beam of radiant energy transmitted to and from a magneto-optic recording medium.

In order to understand the background of the invention, reference is first made to FIG. 1 wherein a conventional optical head of an optical magnetic read/write device, generally indicated at 1600, is depicted. A semiconductor laser 1601 emits a beam of light 1620 which is directed through a collimating lens 1602. Collimating lens 1602 produces a collimated laser beam 1620. Beam 1620 is directed through a beam splitter 1603, through an objective lens 1604 and onto a magneto-optic recording medium 1605. Light reflected from magneto-optic recording medium 1605 is transmitted back through beam 1603 and through a half wave length plate 1606 and a polarizing beam splitter 1607 which divides the reflective beam of light into a first light beam 1622 and a second light beam 1624.

Light beam 1622 passes through a first optical detection system, generally indicated as 1626. Light beam 1622 first passes through convex lens 1608 then a cylindrical lens 1609 where it is projected onto a quadrant photo diode 1610 which a produces synthetic signal in response thereto. Light beam 1624 passes through a second optical detection system, generally indicated as 1628. Optical detection system 1628 includes a convex lens 1611 and a photo diode 1612. Light impinging on photo diode 1612 produces a signal. An optical magnetic read signal is obtained by producing a signal representing the difference between the signal produced by optical detection system 1628 and the synthetic signal produced by optical detection system 1626.

In accordance with a method known in the art as illustrated in Lee, "Optical Technology For Compact Disc Pick-ups", *Laser and Optronics* Vol. 5, No. 9, September 1987, a prepit signal which is modulated by the light strength of received light beams and a track error signal which is modulated by the wobbling pit are obtained as a function of the synthetic signal produced by the first optical detection signal 1626 and the signal produced by the second optical detection system 1628.

Reference is now made to FIG. 17 in which a signal processing circuit constructed in accordance with the prior art is depicted. A photo diode 1701 provides an input to a pre-amp 1703. Pre-amp 1703 converts the current input into a corresponding voltage output signal. A quadrant photo diode 1702 provides an output to four respective pre-amps 1704, 1705, 1706 and 1707 from each respective quadrant of quadrant photo diode 1702 to accomplish the current voltage conversion. A first adder 1708 receives an input from preamps 1704 and 1706. A second adder 1709 receives inputs from preamps 1705 and 1707. A third adder 1710 receives an input from adder 1708 and an input from adder 1709. An op-amp 1711 also receives an input from adders 1708 and 1709 to produce a focus error signal at an output 1716. An op-amp 1713 receives an input from pre-amp 1703 and adder 1710 to produce a magneto-optical read signal at an output 1714. An adder 1712 receives an input from pre-amp 1703 and adder 1710 to produce a prepit signal and track error signal at an output 1715.

Such conventional optical head and magnetic optical read/write devices have been less than satisfactory. The conventional devices require five amplifiers having low noise and broad band capabilities requiring complex processing circuitry resulting in an optical system which is very complex including a very large optical head. Additionally, because the magneto-optical signal reading system is not symmetric, the magneto optical reading signal tends to deteriorate due to the unbalance of the phase properties of the processing circuit. Additionally, the conventional optical heads and magneto optical processing systems do not lend themselves to high speed use.

Accordingly, it is desired to provide a miniaturized optical head for use in a magneto-optical read/write system which overcomes the shortcomings of the prior art and which achieves the objects and benefits associated with a less complex magneto-optical read/write system.

SUMMARY OF THE INVENTION

Generally speaking, in accordance with the present invention, an optical head and magneto-optical read/write device for reading and writing data on a magneto-optical recording medium, is provided. The optical head includes a light source for projecting a beam of light onto the medium and receiving light reflected therefrom. The light is projected through an objective lens. A beam divider divides the light reflected from the recording medium into at least two beams oriented in at least two directions. Each of the divided beams is received by a respective photoelectric transducer. An analyzer provided in the light path between the beam divider and the photoelectric transducer analyzes the divided beams. A focus mechanism changes the cross-sectional form of the beams in accordance with any deviation of focusing attributed to the objective lens provided in the optical head.

The photoelectric transducer elements each receive a portion of the reflected light and generate a signal in response to the light reflected from the magneto-optical recording medium. A focusing servo circuit receives the signals from each respective photoelectric transducer, determines the difference between respective signals of each transducer and generates a focus error signal based upon a low frequency component of the differential signal and focuses the optical head in response thereto.

The beam divider may be a diffractor for providing light beam bundles.

Accordingly, it is an object of this invention to provide an improved optical read/write device.

Another object of this invention is to provide an improved optical head incorporated in an optical read/write device.

A further object of the present invention is to provide an optical read/write device having a simplified processing circuit.

Yet another object of the invention is to locate the signal detection system at a single position to allow miniaturization of the optical head providing an optical read/write device which is more compact.

Still another object of the present invention is to provide a read/write device which is suitable to high speed signal performance.

Yet another object of the present invention is to provide an optical read/write system which provides an improved optical read/write device having a miniaturized structure while still providing a high degree of operability and reliability.

Still other objects and advantages of the invention will in part be obvious and in part will be apparent from the specification and drawings.

The invention accordingly comprises features of construction, combination of elements and arrangements of parts which will be exemplified in the constructions hereinafter set forth and the scope of the invention will be indicated in the claims.

BRIEF DESCRIPTION OF THE DRAWINGS

For a fuller understanding of the invention, reference is made to the following, more detailed description taken in conjunction with the accompanying drawings, in which:

FIG. 13 is a schematic diagram of an assembly of optical components contained in an optical head according to the fifth embodiment of the present invention;

FIG. 14 is a front elevational view of the formation of light images on the photoelectric transducer elements in accordance with the fifth embodiment of the invention;

DETAILED DESCRIPTION OF THE PREFERRED EMBODIMENTS

Figure 1:
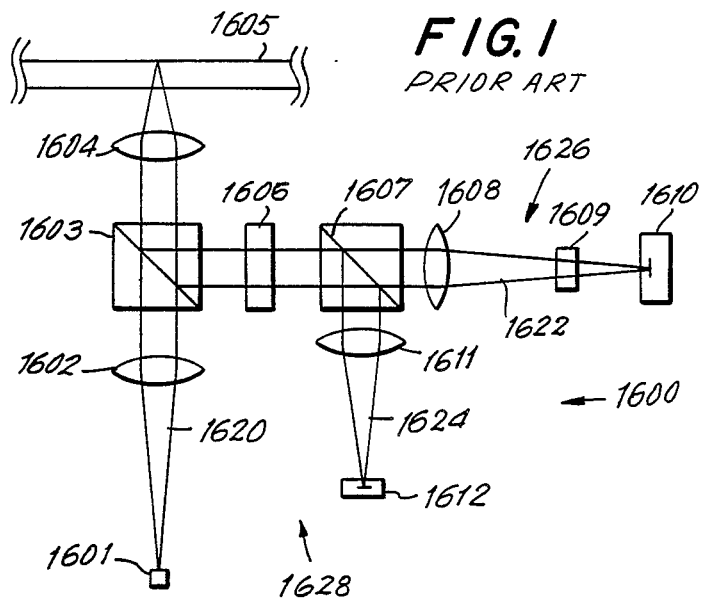
FIG. 1 is a schematic diagram of an optical head constructed in accordance with the prior art.
Figure 2:
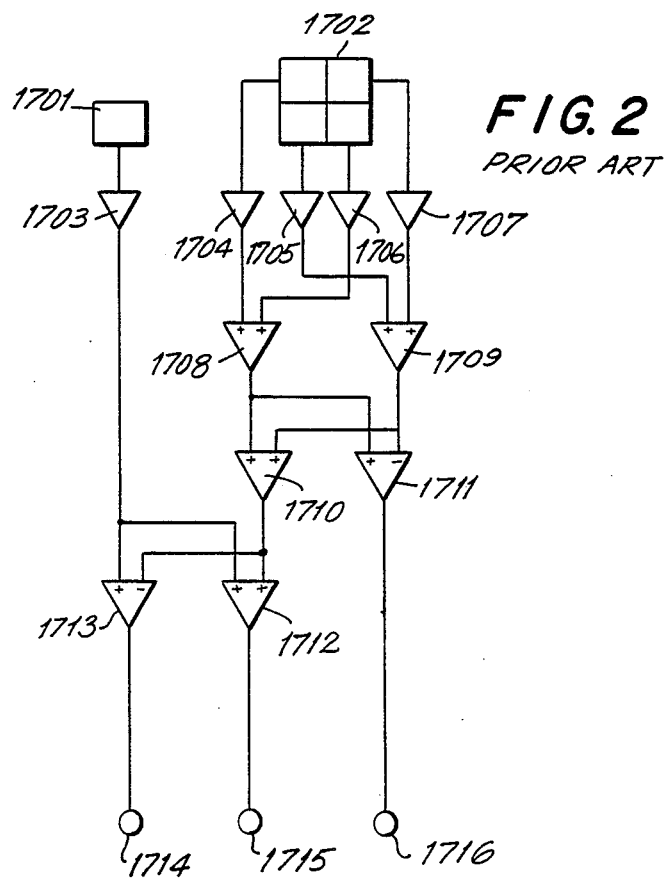
FIG. 2 is a block diagram of a signal processing circuit constructed in accordance with the prior art.
Figure 3A:
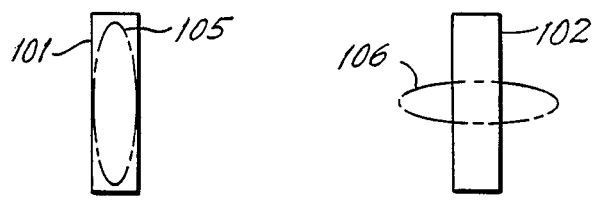
FIGS. 3A, 3B and 3C depict light images formed on the photoelectric transducers of the optical read/write device in accordance with the present invention.
Figure 3B:
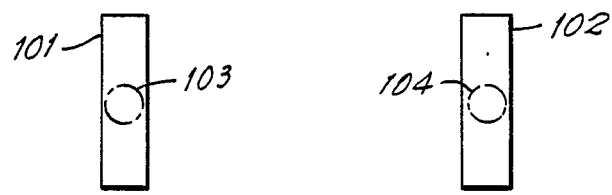
Figure 3C:
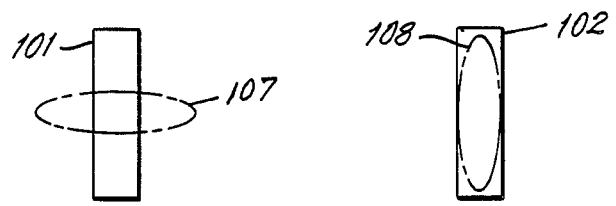

Reference is first made to FIGS. 3A, 3B and 3C wherein photoelectric transducers 101 and 102 are depicted. As will be described in greater detail below, in accordance with the present invention, a light beam is divided into two parts so that each part is transmitted to a respective photoelectric transducer 101 and 102.

As can be seen in FIG. 3B each photoelectric transducer 101 and 102 is generally band shaped and located in parallel to each other. When the light beam transmitted to the optical recording medium is properly focused, the divided light beams each approximate circular spots 103 and 104 which are collected on each photoelectric transducer 101 and 102. During this condition, the difference signal generated by comparing the outputs of photoelectric transducers 101 and 102 is zero.

As seen in FIG. 3A, when the optical recording medium is a distance too far away from the objective lens, a focal line of light 105 parallel to photo transducer 101 is collected by photo transducer 101. On the other hand, the focal line 106 of light transmitted to photo transducer 102 is not parallel to the longer height side of photo transducer 102 but is substantially parallel to the shorter width size. Accordingly, the output of first photoelectric transducer 101 is greater than that of the output of second photoelectric transducer 102. Accordingly, the difference signal produced by comparing the outputs of each photoelectric transducer element 101 and 102 is greater than zero.

As seen in FIG. 3C, when the optical recording medium is too near the objective lens, the direction of focal line 108 of light transmitted onto photoelectric transducer 102 is parallel to the long side of photoelectric transducer 102. On the other hand, the focal line 107 of light transmitted to photo transducer 101 is not parallel to the long side of photo transducer 101. Accordingly, the output of first photoelectric transducer 101 is less than the output of second photoelectric transducer 102. Accordingly, the difference signal generated by comparing the output of each photoelectric transducer 101 and 102 is less than zero.

Figure 4:
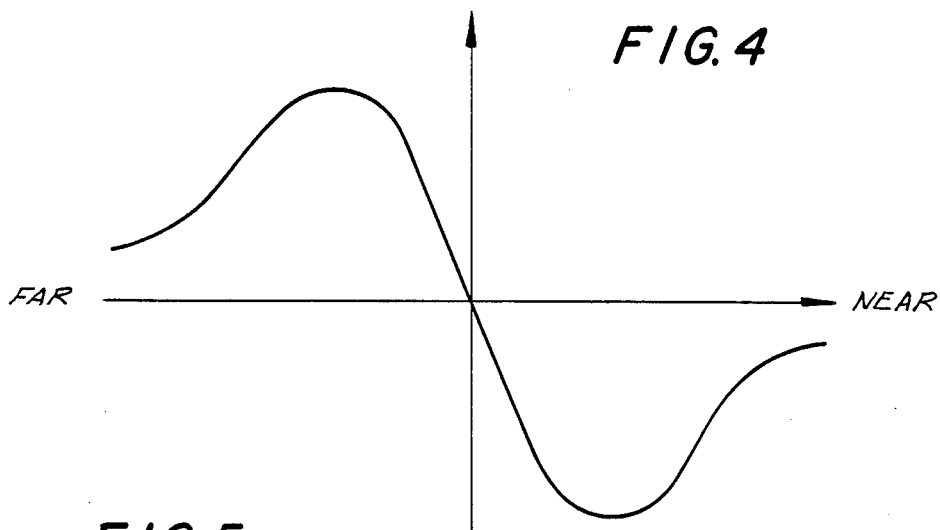
FIG. 4 is a graph of the focus error signal characteristic developed from the transducers of FIGS. 3A, 3B and 3C.

Reference is now made to FIG. 4 in which the focus error signal resulting from the orientations of photoelectric transducers 101 and 102 is depicted. As can be seen, as discussed above, by reducing the output of the second photoelectric transducer 102 relative to the output of first photoelectric transducer 101, the focus error signal as shown in the graph goes from negative values to positive values producing a focus error signal as depicted.

FIGS. 3A-3C represent the result of unequal pitch grating in which the grating pitch increases or decreases from one end to the other to act as the beam divider as well as a change in the cross-sectional form of the beam.

Figure 5:
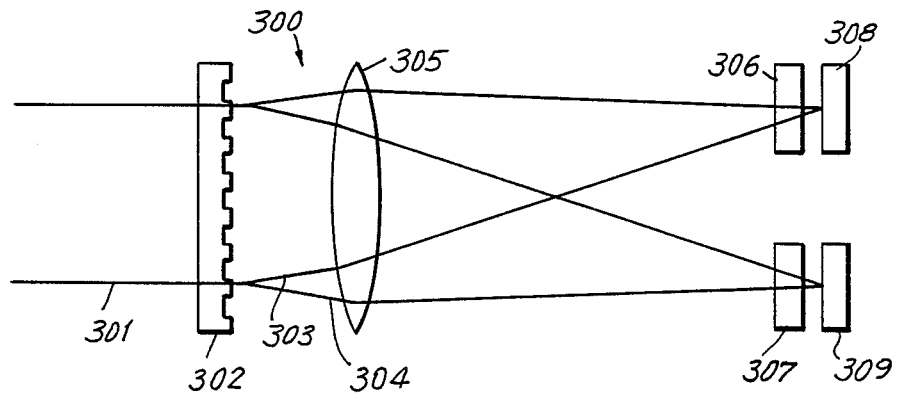
FIG. 5 is a schematic diagram indicating the magneto optical detection mechanism in accordance with the present invention.
Figure 6:
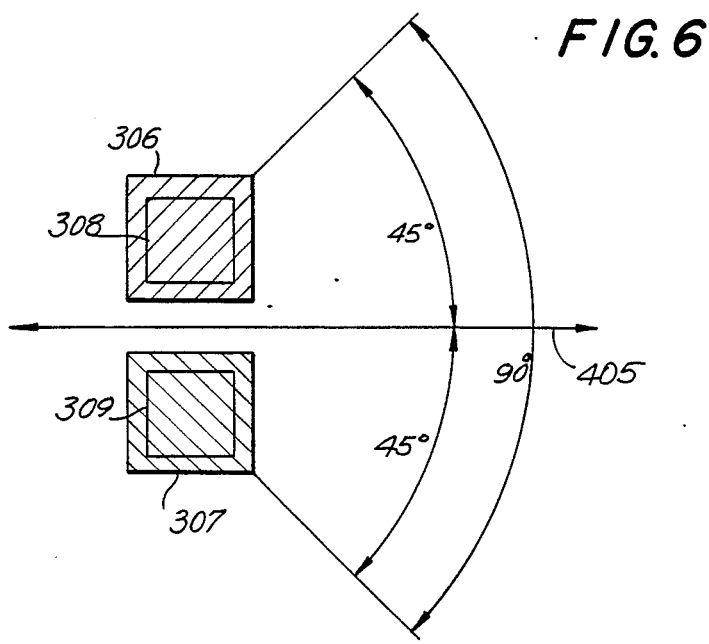
FIG. 6 is graphic illustration of the polarization orientation developed by the analyser utilized in the optical read/write device of the present invention.

Reference is now made FIGS. 5 and 6 wherein a magneto optical signal reading system, generally indicated at 300 constructed in accordance with the present invention is provided. As will be seen the magneto-optical signal can be detected by providing an analyzer.

A light beam 301 reflected from the magneto optical recording medium is divided into two light beams 303 and 304 by a defractor 302. By way of example, defractor 302 may be a grate or the like. Beams 303 and 304 are collected by a condenser lens 305 and are then emitted through respective polarizers 306 and 307. The light detected by polarizers 306 and 307 is then transmitted to respective photoelectric transducers 308 and 309 wherein the polarized light is converted to an electric signal. The output of photoelectric transducer elements 308 and 309 is then acted upon by an op-amp thereby producing the magneto-optical signal.

As can be seen in FIG. 6, the direction of polarization of polarizer 306 is not identical to the direction of polarization of polarizer 307. The direction of polarization of polarizer 306 and 307 occurs at different angles with respect to a polarization direction 405 of the outgoing light of the optical head. Therefore, it is possible to reverse only the phase of the magneto optical signal, thereby removing noise arising from a differential output.

Figure 7:
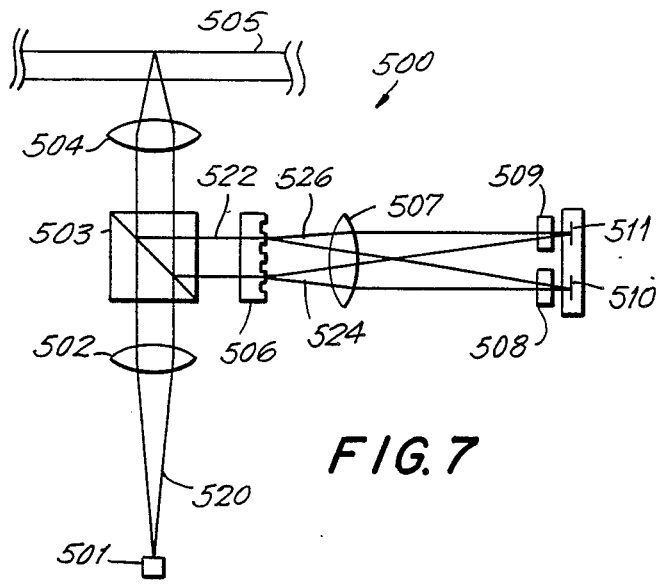
FIG. 7 is a schematic diagram of an assembly of optical components contained in an optical head according to a first embodiment of the present invention.

Reference is now made to FIG. 7 in which a first embodiment of an optical head and optical read/write device, generally indicated at 500, constructed in accordance with the invention is provided. A semiconductor laser 501 emits a laser light 520 which is directed through a collimating lens 502. Collimating lens 502 produces a collimated laser beam 520. Beam 520 is transmitted through an objective lens 504. Objective lens 504 converges the collimated laser beam into a diffraction limited spot on a magneto-optical recording medium 505.

Light is reflected from magneto-optical recording medium 505 through objective lens 504 and beam splitter 503 wherein a reflected beam 522 is produced and is passed through a diffractor 506. Diffractor 506 may be a phase type hologram for generating a plus primary diffraction light wherein the optical depth is approximately ¼ the wavelength for forming an unequal pitch grating in which the diffraction pitch increases or decreases from one end of the grating to the other. Diffractor 506 acts as an astigmatism generator which acts as a beam divider and changes the form of the cross-section of the divided beams.

Diffractor 506 divides the light beam 522 into a first light beam 524 and a second light beam 526. Light beams 524 and 526 pass through convex lens 507. Convex lens 507 converges each beam 524 and 526 so that the converged light beams are analyzed by respective polarizers 508 and 509 which act as analyzers. Light beam 524 converges on polarizer 508 and is then emitted onto photoelectric transducer 510. At the same time, light beam 526 passes through polarizer 509 onto photoelectric transducer 511. Photoelectric transducers 510 and 511 convert polarized light beam 524 and 526 into electric signals.

Figure 8:
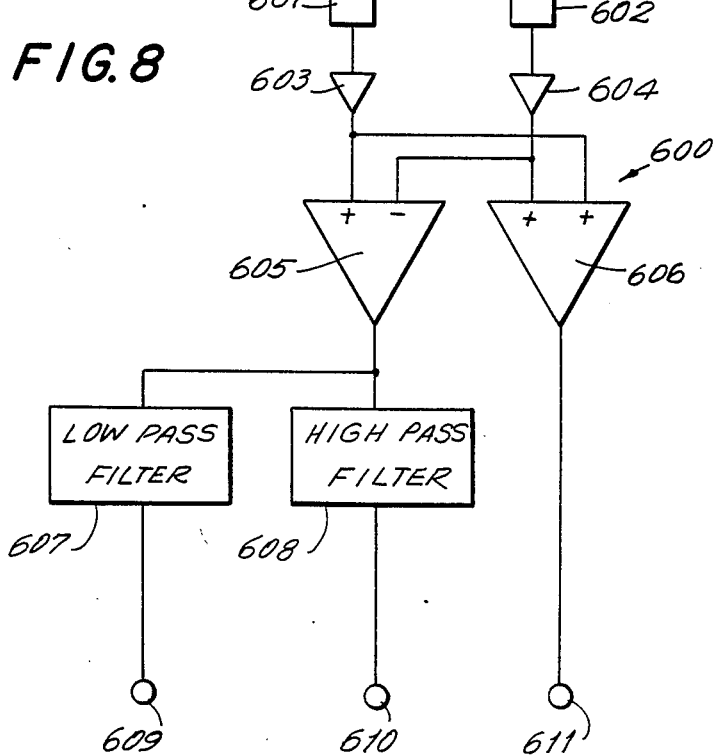
FIG. 8 is a block diagram of the signal processing circuit of the optical read/write device which signal processing circuit may be used in the several embodiments of the present invention.

Reference is now made to FIG. 8 wherein a signal processing circuit, generally indicated at 600, constructed in accordance with the invention is presented. Signal processing circuit 600 contains a first photoelectric transducer 601 and a second photoelectric transducer 602. Each photoelectric transducer provides a current output to respective pre-amplifiers 603 and 604. Pre-amplifiers 603 and 604 have low noise and a broad band width. Pre-amplifiers 603 and 604 convert the current signal to corresponding voltage outputs. An op-amp 605 receives the output of both pre-amplifiers 603 and 604 and provides a signal corresponding to the difference in magnitudes. An adder 606 also receives the output of both pre-amps 603 and 604 to provide a prepit signal which is recorded as the optical strength modulation signal and a track signal provided in accordance with the wobbling of the pit at an output 611. A low pass filter 607 receives the output of op-amp 605 and produces a focusing error signal at output 609. A high pass filter 608 receives the output of op-amp 605 and produces a magneto-optical reading signal at an output 610 to enable detection of data stored on the medium. An objective lens actuator is driven by the focus error signal to servo position the objective lens to correct the focus error.

Figure 9:
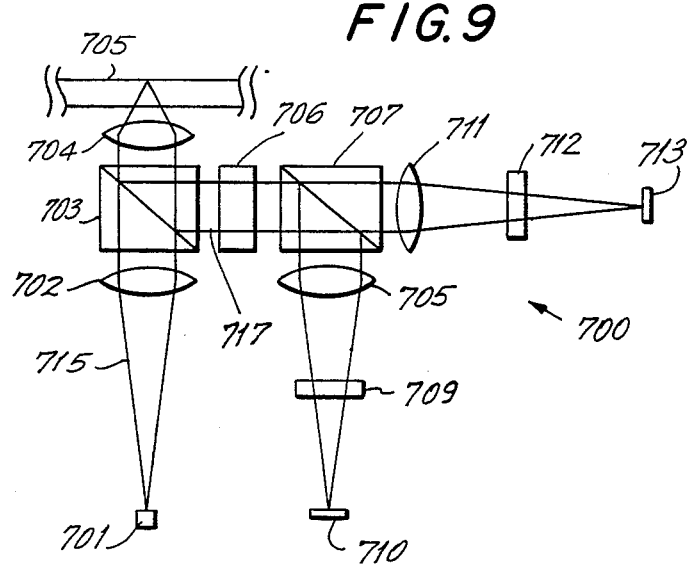
FIG. 9 is a schematic diagram of an assembly of optical components contained in an optical head according to a second embodiment of the present invention.

Reference is now made to FIG. 9 in which a second embodiment of the optical read/write system, generally indicated at 700, is provided. Optical read/write system 700 is similar in operation to optical read/write system 500. A semiconductor laser 701 emits a beam 715 which is transmitted a through a collimating lens 702. The collimated light then passes through a beam splitter 703. Split beam 715 is then emitted through an objective lens 704 which converges beam 715 on magneto-optical recording medium 705. Light is reflected from recording medium 705 back through objective lens 704 through beam splitter 703 forming a reflected beam 717 reflected through a half wavelength plate 706.

The major difference between system 700 and system 500 is that reflected beam 717 then passes through a polarizing beam splitter which acts as the beam divider and analyzer. The divided beam then passes through respective lenses 709 and 712 which act as the astigmatism generators. The split beams are then transmitted onto generally band shaped photoelectric transducers 710 and 713 producing an electric signal in response thereto.

Figure 10:
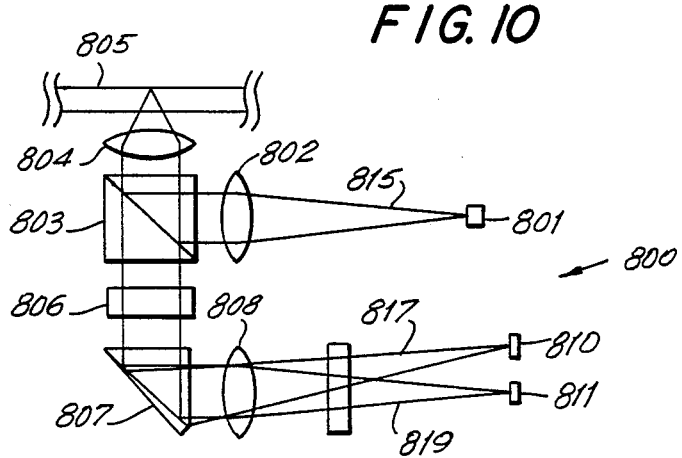
FIG. 10 is a schematic diagram of an assembly of optical components contained in an optical head according to a third embodiment of the present invention.

Reference is now made to FIG. 10 in which a third embodiment of the invention, generally indicated as 800 is depicted. Again optical read/write system 800 behaves in a manner similar to those embodiments described above. A semiconductor laser 801 emits a light beam 815 which passes through collimating lens 802, beam splitter 803 and objective lens 804 to form a converged light spot on a magneto-optical recording medium 805. Light reflected back from recording medium 805 again passes through objective lens 804 beam splitter 803 and a half wavelength plate 806.

However, optical read/write system 800 utilizes a polarizing wedge prism 807 to function as a polarizing beam splitter to divide the beam and act as an analyzer. Divided beams 817 and 819 pass through a condenser 808 and cylindrical lens 809 which act as the astigmatism generator. Light beams 817 and 819 then converge on respective photoelectric transducers 810 and 811.

Figure 11:
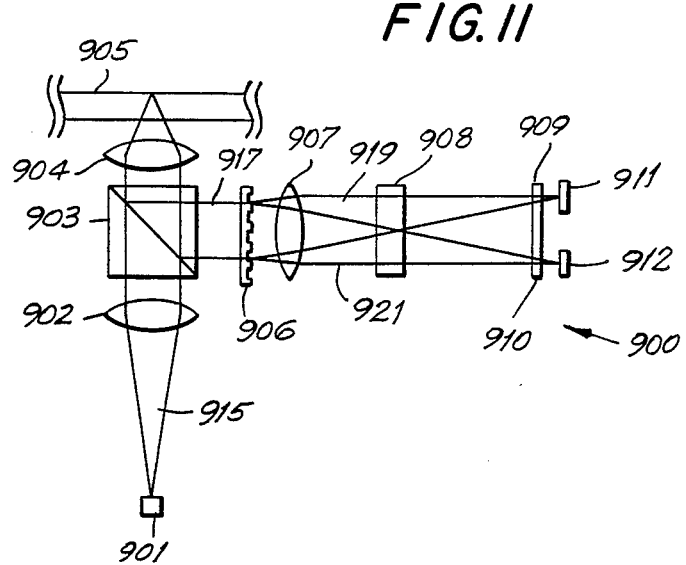
FIG. 11 is a schematic diagram of an assembly of optical components contained in an optical head according to a fourth embodiment of the present invention.

Reference is now made to FIG. 11 wherein a fourth embodiment generally indicated as 900 of an optical read/write system constructed in accordance with the invention is provided. Again, a semiconductor laser 901 emits a laser beam 915 which passes through a collimating lens 902, a beam splitter 903 and an objective lens 904 to form a converged light beam on a magneto-optical recording medium 905. Light reflected from recording medium 905 passes back through objective lens 904 and beam splitter 903 where a reflected beam of light 917 is formed. Reflected beam of light 917 passes through an equal pitch grating 906 which acts as a beam splitter forming split beam bundles 919 and 921. Grating 906 is formed of $SiO_2$ layered on a glass substrate. Split beams 919 and 921 pass through a cylindrical lens 908 through polarizers 909, 910 and onto photoelectric transducers 911 and 912 respectively.

Equal pitch grating 906 is formed so that the concave-convex ratio becomes $\lambda/2n$ wherein $\lambda$ is equal to the wavelength of the light and n is the difference of the refraction index. Equal pitch grating 906 makes the + primary defractional light stream a maximum.

Additionally, in the present embodiment, the photoelectric transducers may be constructed by providing a photo diode in the light path after a mask forming a window having a roughly band shape. The mask may be formed of chrome and glass through pattern etching.

Figure 12:
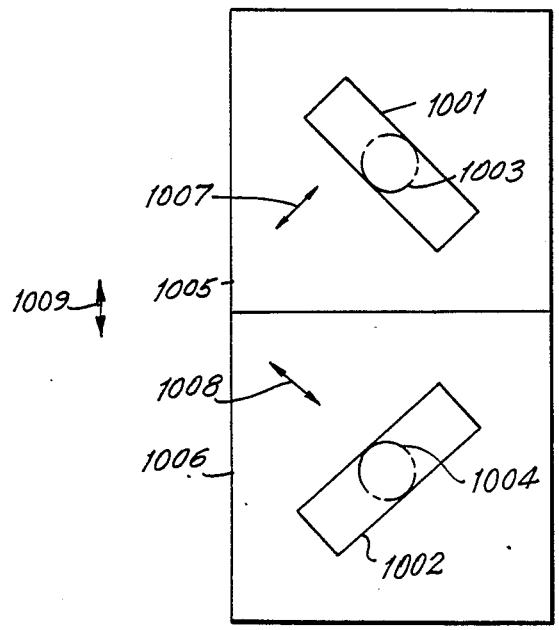
FIG. 12 is a front elevational view of formation of light images on the photoelectric transducer elements in accordance with the fourth embodiment of FIG. 9.

Reference is now made to FIG. 12 wherein two photoelectric transducers generally indicated as 1001 and 1002, for use in conjunction with a cylindrical lens acting as the astigmatism generator, is provided. The direction of the track groove of the magneto optical recording medium is represented by an arrow 1009. When the cylindrical lens 908 (FIG. 11) is located so that the angle between the direction of the longer side of photoelectric transducers 1001 and 1002 and the direction of track groove 1009 of the recording medium is made to be ±45°, this symmetry becomes greater and reproduction of desirable photo magnetic signals may be obtained. As discussed above, this is represented by the orbicular light spots 101 and 103 produced at respective photoelectric transducers 1001 and 1002 by respective polarizers 1006 and 1007.

Reference is now made to FIG. 13 wherein a fifth embodiment of an optical read/write system, generally indicated at 1100, constructed in accordance with the invention is provided. A semiconductor laser 1101 emits a beam 1115 which passes through a collimating lens 1102. Collimating lens 1102 produces a parallel beam 1115 which passes through an objective lens 1103 causing beam 1115 as a light spot an magneto-optical recording medium 1104.

Light reflected by magneto optical recording medium 1104 passes through objective lens 1103 and hologram element 1105 having an unequal pitch grating so that the diffraction pitch increases or decreases from one end to other. An astigmatism equal to that of the concave cylindrical lens is generated in the direction of the ± primary diffraction light while on the other hand an astigmatism equal to that of a convex cylindrical lens is generated in the direction opposed to the ± primary diffractive light. Hologram element 1105 divides the refractive light beams into two parts which is again converged by collimating lens 1102 and analyzed by polarizers 1106 and 1107. The polarized light emitted from polarizers 1106 and 1107 is projected onto respective photo diodes 1108 and 1109.

Reference is now made to FIG. 14 wherein semiconductor laser 1101, polarizers 1106 and 1107 and photoelectric transducers 1106 and 1107 are provided. Arrow 1208 indicates the polarizing direction of the semiconductor laser 1101 while arrows 1209 and 1210 indicate the polarizing directions of polarizers 1107 and 1106 respectively. Additionally, light spots 1206 and 1207 illustrate the light beams hitting photo diodes 1109 and 1108 respectively.

As discussed, in the present embodiment when a diffractor is provided in the light path between light source and the optical recording medium, zero order light generated by the diffractor is required to have more than primary light strength. This is because when the ratio of the strength of the zero order light, + primary light and − primary light is 1:1:1, the luminous efficacy of the outgoing light of the objective lens is 33% at most. This is because the 33% value is the lowest obtainable value in accordance with the output of the semiconductor laser and the recording sensitivity of the optical recording medium.

Figure 15:
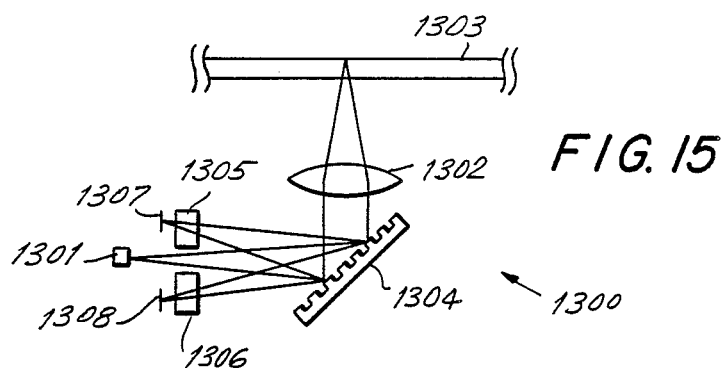
FIG. 15 is a schematic diagram of the optical components contained in the optical head according to a sixth embodiment of the present invention.

Reference is now made FIG. 15 in which a sixth embodiment of an optical read/write system, generally indicated at 1300, constructed in accordance with the invention is provided. System 1300 is similar to System 1100. However, a reflective hologram element 1304 is substituted for the light passing hologram element of system 1100. A semiconductor laser 1301 emits a beam of light which is reflected by hologram element 1304 through an objective lens 1302 to form a light spot on a magneto-optical recording medium 1303. Light reflected from optical recording medium 1303 then passes again through objective lens 1302 onto hologram element 1304 which acts as a beam splitter to split the reflected light beam into two beams. A first light beam passes through a polarizer 1305 onto a phototransducer 1307. A second beam is transmitted through a polarizer 1306 onto a photo transducer 1308. This construction allows for making the optical head thinner by biasing the optical path. Objective lens 1302 is a finite series objective lens.

Figure 16:
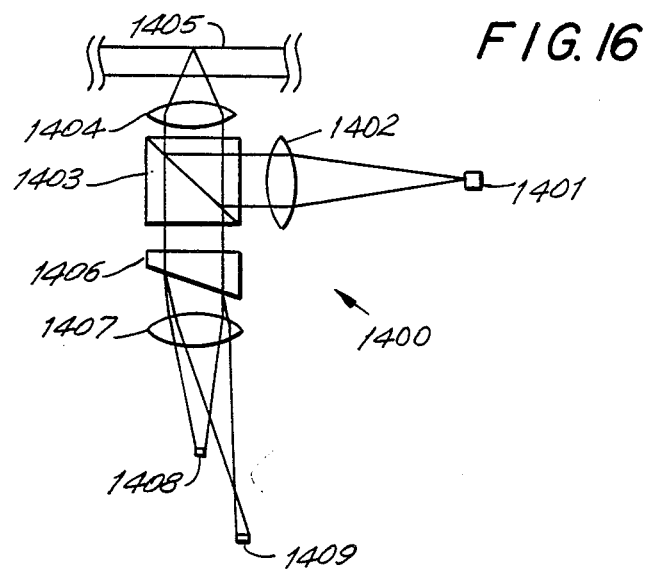
FIG. 16 is a schematic diagram of the optical components contained in an optical head according to a seventh embodiment of the present invention.
Figure 17:
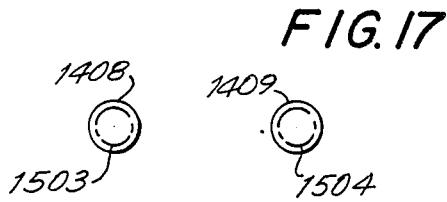
FIG. 17 is a front elevational view of the photoelectric transducer in accordance with the seventh embodiment of the invention.

Reference is now made to FIGS. 16 and 17 wherein a seventh embodiment of an optical read/write system, generally indicated as 1400, constructed in accordance with the invention is provided. A semiconductor laser 1401 emits a beam of light passing through a condenser 1402, a beam splitter 1403 and an objective lens 1404 to form a point of light on a magneto-optical recording medium 1405. Reflected light passes through objective lens 1404 and beam splitter 1403 through a birefringence wedge 1406 which uses crystal as the beam dividing means and the analyzer. The divided beams then pass through a convex lens 1407. A photoelectric transducer 1408 is located within the focus of convex lens 1407 while photoelectric transducer 1409 is located outside of the focus of convex lens 1407. Photoelectric transducer elements 1408 and 1409 are formed as orbicular photoelectric transducer elements as illustrated in FIG. 15. Accordingly, the farther the objective lens is from the optical recording medium, the greater the output of photoelectric transducer 1408, while the nearer the objective lens to the optical recording medium, the greater the output of photoelectric transducer 1409. In this embodiment, changing the cross-sectional form of the split reflective light beams is conducted by the entire structure 1400.

By providing an optical head for use in an optical read/write system having an objective lens, a light beam divider which divides light reflected from the optical recording means into divided light beams oriented in different directions and structure for changing the cross-sectional form of the divided beams so that each divided beam has a cross-section variable with the focus deviation of the objective lens, analyzers disposed in the reflective beam path and a pair photoelectric transducers, disposed in the respective beam path beyond the analyzers, desirable magneto-optical signals, positioning signals and error signals may be obtained using a maximum of two pre-amplifiers in a simple processing circuit. Additionally, it becomes possible to locate the signal detection system at one position, thereby miniaturizing the optical head which in turn provides an entire compact optical read/write device. Furthermore, it becomes possible to make the magneto-optical signal detection system completely symmetrical, thereby performing signal reproduction with respect to high speed signals of more than 10 mhz. Additionally, as discussed above, the present invention provides an improved optical read/write device of a miniaturized size while retaining high quality.

It will thus be seen that the objects set forth above and those made apparent in the preceding description are efficiently attained and since certain changes may be made in the above constructions without departing from the spirit and scope of the invention it is intended that all matters shall be interpreted as illustrative and not in a limiting sense.

It is also to be understood that the following claims are intended to cover all of the generic and specific features of the invention herein described, and all statements of the scope of the invention in which, it is a matter of language might be said to fall therebetween.

What is claimed is:

1. An optical head for use in an optical read/write system for reading or writing data from or to a magneto optical recording medium, the system including means for directing a beam of radiant light energy at the recording medium, the optical head comprising:
   an objective lens;
   light beam dividing means for dividing light returned from the optical recording medium through the objective lens into divided beams which are oriented in at least two directions;
   means for changing the cross-sectional form of the returned beam such that each divided beam has a cross-section that is variable as a function of the focus deviation of the objective lens;
   analyzer means disposed in one or more beam paths, for performing an analyzer function on each divided beam; and
   a first and a second photoelectric transducer, each one disposed in a respective beam path forward of the analyzer means, to receive impinging beam light passing through the analyzer means.

2. An optical head according to claim 1, further comprising a polarizing prism disposed in the path of the beam returned from the recording medium, and serving as the beam dividing means and as the analyzer means for each photoelectric transducer.

3. An optical head according to claim 2, further comprising an individual astigmatism generating means disposed in each divided beam path, preceding the respective photoelectric transducer.

4. An optical head according to claim 3, wherein each astigmatism generating means includes a cylindrical lens.

5. An optical head according to claim 1, further comprising multi-purpose optical means for performing the functions of both the beam dividing means and the means for changing the beam cross-sectional form.

6. An optical head according to claim 1, wherein the means for changing the beam cross-sectional form comprises diffraction means.

7. An optical head according to claim 6, wherein the diffraction means comprises a hologram having a diffraction grating with non-uniform grating pitch which increases or decreases from one end to the other end of the diffraction grating whereby the diffraction means further serves as means for generating astigmatism in the light beam emanating therefrom.

8. An optical head according to claim 5, wherein the means for changing the beam cross-sectional form comprises diffraction means.

9. An optical head according to claim 8, wherein the diffraction means comprises a hologram having a diffraction grating with non-uniform grating pitch which increases or decreases from one end to the other end of the diffraction grating whereby the diffraction means further serves as means for generating astigmatism in the light beam emanating therefrom, and also further serves as the analyzer means.

10. An optical head according to claim 8, wherein the diffraction means comprises a diffraction grating having uniform grating pitch, wherein the analyzer means comprises polarizer plate means disposed in the path of each respective divided beam and preceding the photoelectric transducers, the optical head further comprising cylindrical lens means disposed in the paths of the divided beams preceding the photoelectric transducers, and serving to introduce astigmatism into the divided beams.

11. An optical head according to claim 10, wherein forward of the diffraction grating there are disposed in the divided beam paths in order a condenser lens, then the cylindrical lens means, then the polarizing plate means, and then the photoelectric transducers.

12. An optical head according to claim 11, wherein the cylindrical lens means is a single cylindrical lens, the polarizer plate means is a single polarizer plate, and wherein the condenser lens, the cylindrical lens and the polarizer plate each extend through the several divided beams.

13. An optical head according to claim 5, further comprising a reflective hologram element disposed in the path of the beam returned from the recording medium and adapted to reflect the same in divided beams, thereby serving as the beam dividing means.

14. An optical head according to claim 13, wherein the analyzer means comprises a separate, individual polarizer disposed in each respective divided beam path and preceding the respective photoelectric transducer.

15. An optical head according to claim 5, further comprising a birefringence wedge disposed in the path of the beam returned from the recording medium and adapted to refract said returned beam into divided beams, thereby serving as the beam dividing means and the analyzer means.

16. An optical head according to claim 15, further comprising a convex condenser lens disposed intermediate the birefringence wedge and the photoelectric transducers, and serving to contribute to the beam division function, and to concentrate the divided beams onto their respective photoelectric transducers.

17. An optical head according to claim 1, wherein:
   the first and second photoelectric transducers each have a light receiving surface having the general outline of a rectangle defined by a pair of shorter sides, the width-sides, and a pair of longer sides, the height-sides, the arrangement being such that:
   where the objective lens is properly focused, there appears on the first and on the second transducer respectively a first and a second light spot essentially centered thereon and having a generally circular shape with diameter substantially equal to the length of a width-side of a photoelectric transducer,
   where the objective lens is positioned too far from the optical recording medium, the circular light spots on the first and on the second transducers are elongated into respective ovals, the first light spot being elongated along the height direction and the second light spot in the direction substantially transverse thereto; and where the objective lens is positioned too near the optical recording medium, the circular light spot on the first and second transducers are elongated into respective ovals, the second light spot being elongated along the height direction and the second light spot in the direction substantially transverse thereto.

18. An optical head according to claim 3, wherein:
the first and second photoelectric transducers each have a light receiving surface having the general outline of a rectangle defined by a pair of shorter sides, the width-sides, and a pair of longer sides, the height-sides, the arrangement being such that:
where the objective lens is properly focused, there appears on the first and on the second transducer respectively a first and a second light spot essentially centered thereon and having a generally circular shape with diameter substantially equal to the length of a width-side of a photoelectric transducer,
where the objective lens is positioned too far from the optical recording medium, the circular light spots on the first and on the second transducers are elongated into respective ovals, the first light spot being elongated along the height direction and the second light spot in the direction transverse thereto,
where the objective lens is positioned too near the optical recording medium, the circular light spot on the first and second transducers are elongated into respective ovals, the second light spot being elongated along the height direction and the second light spot in the direction substantially transverse thereto.

19. An optical head according to claim 9, wherein:
the first and second photoelectric transducers each have a light receiving surface having the general outline of a rectangle defined by a pair of shorter sides, the width-sides, and a pair of longer sides, the height-sides, the arrangement being such that:
where the objective lens is properly focused, there appears on the first and on the second transducer respectively a first and a second light spot essentially centered thereon and having a generally circular shape with diameter substantially equal to the length of a width-side of a photoelectric transducer,
where the objective lens is positioned too far from the optical recording medium, the circular light spots on the first and on the second transducers are elongated into respective ovals, the first light spot being elongated along the height direction and the second light spot in the direction transverse thereto,
where the objective lens is positioned too near the optical recording medium, the circular light spot on the first and second transducers are elongated into respective ovals, the second light spot being elongated along the height direction and the second light spot in the direction substantially transverse thereto.

20. An optical head according to claim 10, wherein:
the first and second photoelectric transducers each have a light receiving surface having the general outline of a rectangle defined by a pair of shorter sides, the width-sides, and a pair of longer sides, the height-sides, the arrangement being such that:
where the objective lens is properly focused, there appears on the first and on the second transducer respectively a first and a second light spot essentially centered thereon and having a generally circular shape with diameter substantially equal to the length of a width-side of a photoelectric transducer,
where the objective lens is positioned too far from the optical recording medium, the circular light spots on the first and on the second transducers are elongated into respective ovals, the first light spot being elongated along the height direction and the second light spot in the direction transverse thereto,
where the objective lens is positioned too near the optical recording medium, the circular light spot on the first and second transducers are elongated into respective ovals, the second light spot being elongated along the height direction and the second light spot in the direction substantially transverse thereto.

21. An optical read/write system comprising:
the optical head of claim 1;
signal-subtraction circuit means connected to the photoelectric transducers for producing an electrical signal representing the difference in magnitude of the transduced photoelectric signals emanating from the photoelectric transducers; and
high pass filter means and low pass filter means connected to the output of the signal-subtraction circuit means, to respectively produce:
a high frequency component of the difference signal, the high frequency component being modulated with data retrieved from the recording medium and being utilizable in the optical read/write system for detection of such retrieved data, and
a low frequency component of the difference signal representing a focus error signal which is utilizable in the optical read/write system to correct the focus error by servo-positioning the objective lens in a direction orthogonal to the recording surface of the recording medium.

22. An optical read/write system comprising:
the optical head of claim 1, and
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

23. An optical read/write system according to claim 21, further comprising:
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

24. An optical read/write system comprising:
the optical head of claim 17;
signal-subtraction circuit means connected to the photoelectric transducers for producing an electrical signal representing the difference in magnitude of the transduced photoelectric signals emanating from the photoelectric transducers; and high pass filter means and low pass filter means connected to the output of the signal-subtraction circuit means, to respectively produce:

a high frequency component of the difference signal, the high frequency component being modulated with data retrieved from the recording medium and being utilizable in the optical read/write system for detection of such retrieved data, and a low frequency component of the difference signal representing a focus error signal which is utilizable in the optical read/write system to correct the focus error by servo-positioning the objective lens in a direction orthogonal to the recording surface of the recording medium.

25. An optical read/write system comprising:
the optical head of claim 17, and
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

26. An optical read/write system according to claim 24, further comprising:
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

27. An optical read/write system comprising:
the optical head of claim 18;
signal-subtraction circuit means connected to the photoelectric transducers for producing an electrical signal representing the difference in magnitude of the transduced photoelectric signals emanating from the photoelectric transducers; and
high pass filter means and low pass filter means connected to the output of the signal-subtraction circuit means, to respectively produce:
a high frequency component of the difference signal, the high frequency component being modulated with data retrieved from the recording medium and being utilizable in the optical read/write system for detection of such retrieved data, and
a low frequency component of the difference signal representing a focus error signal which is utilizable in the optical read/write system to correct the focus error by servo-positioning the objective lens in a direction orthogonal to the recording surface of the recording medium.

28. An optical read/write system comprising:
the optical head of claim 18, and
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

29. An optical read/write system according to claim 27, further comprising:
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

30. An optical read/write system comprising:
the optical head of claim 19;
signal-subtraction circuit means connected to the photoelectric transducers for producing an electrical signal representing the difference in magnitude of the transduced photoelectric signals emanating from the photoelectric transducers; and
high pass filter means and low pass filter means connected to the output of the signal-subtraction circuit means, to respectively produce:
a high frequency component of the difference signal, the high frequency component being modulated with data retrieved from the recording medium and being utilizable in the optical read/write system for detection of such retrieved data, and
a low frequency component of the difference signal representing a focus error signal which is utilizable in the optical read/write system to correct the focus error by servo-positioning the objective lens in a direction orthogonal to the recording surface of the recording medium.

31. An optical read/write system comprising:
the optical head of claim 19, and
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

32. An optical read/write system according to claim 30, further comprising:
signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

33. An optical read/write system comprising:
the optical head of claim 20;
signal-subtraction circuit means connected to the photoelectric transducers for producing an electrical signal representing the difference in magnitude of the transduced photoelectric signals emanating from the photoelectric transducers; and high pass filter means and low pass filter means connected to the output of the signal-subtraction circuit means, to respectively produce:

a high frequency component of the difference signal, the high frequency component being modulated with data retrieved from the recording medium and being utilizable in the optical read/write system for detection of such retrieved data, and a low frequency component of the difference signal representing a focus error signal which is utilizable in the optical read/write system to correct the focus error by servo-positioning the objective lens in a direction orthogonal to the recording surface of the recording medium.

34. An optical read/write system comprising:

the optical head of claim 20, and signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

35. An optical read/write system according to claim 33, further comprising:

signal-adding means connected to the photoelectric transducers, for producing an electrical signal representing the sum of magnitudes of the transduced photoelectric signals emanating from the photoelectric transducers, the resultant sum output signal representing a tracking error signal and being utilizable in the optical read/write system to correct tracking error by servo-positioning the objective lens in a direction generally parallel to the recording surface of the recording medium.

36. In an optical read/write system for reading or writing data from or to an optical recording medium, the system including means for directing a beam of radiant light energy at the recording medium, an objective lens for focusing the so directed beam on the recording medium, and an optical head which includes the objective lens and further includes optical means for dividing a light beam returned from the optical recording medium into a first and a second divided beam, respective first and second optical means each for further optically processing the respective divided beams to respectively produce first and second optically processed beams, and respective first and second photoelectric transducers for receiving and transducing the first and second optically processed beams to first and second transduced electric signals:

electronic processing circuitry for electronically processing the transduced first and second electronic signals comprising:

a first and a second preamplifier, each having an input which is connected to the respective one of the first and second transducers, for producing an amplified first and second transduced signal respectively, signal-adding circuit means and signal-subtraction circuit means, each having a pair of inputs connected to the outputs of the first and second preamplifiers, to respectively provide a sum output signal which is utilizable in the system as a tracking error signal to correctly servo-position the objective lens for minimum tracking error, and a difference output signal; and high pass filter means and low pass filter means connected to receive the difference output signal to respectively produce:

a high frequency component of the difference output signal, the high frequency component being modulated with data retrieved from the recording medium and being utilizable in the optical read/write system for detection of such retrieved data, and a low frequency component of the difference signal representing a focus error signal which is utilizable in the optical read/write system to correct the focus error by servo-positioning the objective lens.

37. An optical read/write system according to claim 36, wherein:

the first and second photoelectric transducers each have a light receiving surface having the general outline of a rectangle defined by a pair of shorter sides, the width-sides, and a pair of longer sides, the height-sides, the arrangement being such that:

where the objective lens is properly focused, there appears respectively on the first and on the second transducer a first and second light spot essentially centered thereon and having a generally circular shape with diameter substantially equal to the length of a width-side of a photoelectric transducer, where the objective lens is positioned too far from the optical recording medium, the circular light spots on the first and on the second transducer are elongated into respective ovals, the first light spot being elongated along the height direction and the second light spot in the direction transverse thereto, where the objective lens is positioned too near the optical recording medium, the circular light spot on the first and second transducers are elongated into respective ovals, the second light spot being elongated along the height direction and the second light spot in the direction substantially transverse thereto.

38. An optical read/write system according to claim 37, wherein the beam dividing means comprises a polarizing prism operating as a beam splitter to provide the first and second divided beams, and also functioning as analyzing means, and wherein in the first and second divided beam paths there are disposed in order, a respective first and a respective second condensing lens, a respective first and a respective second cylindrical lens operating as astigmatism generating means, and the aforesaid respective first and respective second photoelectric transducers.

39. An optical read/write system according to claim 38, wherein in the light beam return path from the recording medium there are disposed, in order, the aforesaid objective lens, a beam splitter, a half-wavelength plate, and then the aforesaid polarizing beam splitter.

40. An optical read/write system according to claim 37, wherein the beam dividing means comprises diffraction means adapted to receive a beam returned from the optical recording medium, and diffract the returned beam into a pair of beam bundles, the diffraction means also serving as a means for changing the crosssectional form of the returned beam and as an astigmatism generating means, a condenser lens disposed in the path of the beam bundles and generating therefrom the first and second beams, and polarizer plate means disposed in the path of the first and the second beam and preceding the first and the second transducer, the polarizer plate means operating as an analyzer means.

41. An optical read/write system according to claim 40, wherein the diffraction means is of the phase hologram type, being provided with non-uniform pitch grating of the kind in which the grating pitch increases or decreases from one end of the diffraction means to the other end.

42. An optical read/write system according to claim 37, wherein the beam dividing means comprises diffraction means adapted to receive a beam returned from the optical recording medium, and diffract the returned beam into a pair of beam bundles, the diffraction means also serving as a means for changing the cross-sectional form of the returned beam, a condenser lens disposed in the path of the beam bundles and generating therefrom the first and second beams, and consecutive to the condenser lens, cylindrical lens means and polarizer plate means both disposed in the path of the first and the second beam and preceding the first and the second transducer, the cylindrical lens means operating as an astigmatism generating means and the polarizer plate means operating as an analyzer means.

43. An optical read/write system according to claim 42, wherein the diffraction means is of the phase hologram type, being provided with uniform pitch grating.

44. An optical read/write system according to claim 37, further comprising a reflective hologram device disposed in the path of the beam returned from the recording medium and adapted to reflect the same in divided beams, thereby serving as a beam dividing means, and following the reflective hologram device, a first and a second polarizer each operating as an analyzer and respectively disposed in the first and second beam path preceding the first and second transducers, respectively.

45. An optical read/write system according to claim 37, further comprising a birefringence wedge disposed in the path of the beam returned from the recording medium and adapted to refract the same into divided beams, thereby serving as a beam dividing means and an analyzer means, and a convex condenser lens disposed in the first and second beam paths intermediate the birefringence wedge and the first and second photoelectric transducers, and serving to contribute to the beam division function, and to converge the divided beams onto their respective photoelectric transducers.

46. An optical read/write system according to claim 37, further comprising a polarizing wedge prism disposed in the path of the beam returned from the recording medium and adapted to divide the returned beam into a pair of beam bundles, a condenser lens serving as a beam dividing means disposed in the path of the beam bundles and adapted to generate therefrom a first and a second beam directed at the first and second transducers respectively, and a cylindrical lens serving as astigmatism generating means disposed in the paths of the first and second beams and preceding the first and second transducers.

47. An optical head according to claim 5, further comprising a polarizing wedge beam disposed in the path of the beam returned from the recording medium and adapted to form from the returned beam by reflection and refraction thereof, a pair of beam bundles, the polarizing wedge serving as the analyzer means and the means for changing the beam cross-sectional form, a condenser lens for forming from the beam bundles a first and a second divided beam and directing the divided beams at the first and second photoelectric transducers, respectively, and cylindrical lens disposed in the path of the first and second divided beams preceding the photoelectric transducers, the cylindrical lens serving as an astigmatism generating means.

48. An optical head according to claim 47, wherein:
the first and second photoelectric transducers each have a light receiving surface having the general outline of a rectangle defined by a pair of shorter sides, the width-sides, and a pair of longer sides, the height-sides, the arrangement being such that:
where the objective lens is properly focused, there appears on the first and on the second transducer respectively a first and a second light spot essentially centered thereon and having a generally circular shape with diameter substantially equal to the length of a width-side of a photoelectric transducer,
where the objective lens is positioned too far from the optical recording medium, the circular light spots on the first and on the second transducers are elongated into respective ovals, the first light spot being elongated along the height direction and the second light spot in the direction transverse thereto,
where the objective lens is positioned too near the optical recording medium, the circular light spot on the first and second transducers are elongated into respective ovals, the second light spot being elongated along the height direction and the second light spot in the direction substantially transverse thereto.

49. An optical read/write system comprising:
the optical head of claim 48;
signal-subtraction circuit means connected to the photoelectric transducers for producing an electrical signal representing the difference in magnitude of the transduced photoelectric signals emanating from the photoelectric transducers; and
high pass filter means and low pass filter means connected to the output of the signal-subtraction circuit means, to respectively produce:
a high frequency component of the difference signal, the high frequency component being modulated with data retrieved from the recording medium and being utilizable in the optical read/write system for detection of such retrieved data, and
a low frequency component of the difference signal representing a focus error signal which is utilizable in the optical read/write system to correct the focus error by servo-positioning the objective lens in a direction orthogonal to the recording surface of the recording medium.
servo-positioning the objective lens in a direction generally parallel to the recording surface of the recording medium.

50. An optical read/write system comprising:
the optical head of claim 48;
signal-adding means connected to the photoelectric transducers for producing an electrical signal representing the sum of magnitude of the transduced photoelectric signals emanating from the photoelectric transducers; the resultant sum output signal representing a tracking error signal and being utilizable in the optical read/write system to correct tracking error by servo-positioning the objective lens in a direction generally parallel to the recording surface of the recording medium.

51. An optical read/write system comprising:
the optical head of claim 49;
signal-adding means connected to the photoelectric transducers for producing an electrical signal representing the sum of magnitude of the transduced photoelectric signals emanating from the photoelectric transducers; the resultant sum output signal representing a tracking error signal and being utilizable in the optical read/write system to correct tracking error by servo-positioning the objective lens in a direction generally parallel to the recording surface of the recording medium.

* * * * *